(12) United States Patent
Fujioka

(10) Patent No.: US 11,040,454 B2
(45) Date of Patent: Jun. 22, 2021

(54) ROBOT

(71) Applicant: FANUC CORPORATION, Yamanashi (JP)

(72) Inventor: Naoki Fujioka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/784,557

(22) Filed: Feb. 7, 2020

(65) Prior Publication Data
US 2020/0290212 A1 Sep. 17, 2020

(30) Foreign Application Priority Data
Mar. 11, 2019 (JP) .............................. JP2019-043515

(51) Int. Cl.
  B25J 13/00 (2006.01)
  H02G 11/00 (2006.01)
  B25J 19/00 (2006.01)

(52) U.S. Cl.
  CPC ............. B25J 13/00 (2013.01); B25J 19/005 (2013.01); H02G 11/00 (2013.01)

(58) Field of Classification Search
  CPC .......... B25J 13/00; B25J 19/005; H02G 11/00
  See application file for complete search history.

(56) References Cited

U.S. PATENT DOCUMENTS

| | | |
|---|---|---|
| 2004/0261563 A1 | 12/2004 | Inoue et al. |
| 2013/0260606 A1 | 10/2013 | Hahakura et al. |
| 2014/0020498 A1 | 1/2014 | Adachi |
| 2019/0099903 A1* | 4/2019 | Goto .................. G08B 5/36 |
| 2019/0321988 A1 | 10/2019 | Inoue et al. |

FOREIGN PATENT DOCUMENTS

| | | |
|---|---|---|
| EP | 1491300 A1 | 12/2004 |
| JP | 63-109440 U | 7/1988 |
| JP | 02-100892 A | 4/1990 |
| JP | 2003-025270 A | 1/2003 |
| JP | 3483862 B2 | 1/2004 |
| JP | 2005-014159 A | 1/2005 |
| JP | 4848700 B2 | 12/2011 |
| JP | 2013-212560 A | 10/2013 |
| JP | 2014-018929 A | 2/2014 |
| JP | 2016-150412 A | 8/2016 |
| JP | 2019-188497 A | 10/2019 |

OTHER PUBLICATIONS

Office Action dated May 11, 2021 in Japanese Application No. 2019-043515; 8 pages including English-language translation.

* cited by examiner

Primary Examiner — Mukundbhai G Patel
(74) Attorney, Agent, or Firm — Maier & Maier, PLLC

(57) ABSTRACT

A robot including a base, a first movable part, and a second movable part supported on the first movable part. The base includes an opening portion through which ends of inner cables disposed within the robot are inserted. The robot includes a number of distributing boxes that are detachably attached to the opening portion or to a portion near the opening portion of the base. The distributing boxes respectively include, robot-side walls through which ends of the inner cables are inserted in order to dispose the ends of the inner cables within the distributing boxes, and relay walls provided with connectors to which outer cables from a control device for the robot are connected.

3 Claims, 5 Drawing Sheets

ROBOT

CROSS-REFERENCE TO RELATED APPLICATIONS

This application is based on and claims priority to Japanese Patent Application No. 2019-043515 filed on Mar. 11, 2019, the content of which is incorporated herein by reference in its entirety.

FIELD

The present invention relates to a robot.

BACKGROUND

Conventionally, there is known a robot having a water-resistant distributing box, which is fixed on a back surface of the robot. Such a structure is disclosed in Japanese Patent No. 4848700, for example.

SUMMARY

One aspect of this disclosure provides an articulated robot including a base, a first movable part supported on the base so as to be rotatable about a vertical axis line, and a second movable part supported on the first movable part so as to be rotatable about a predetermined axis line, wherein the base includes an opening portion, the robot includes a plurality of distributing boxes that are detachably attached to the opening portion or to a portion near the opening portion of the base, and each of the distributing boxes includes, a robot side wall through which one end of inner cables disposed within the robot is inserted in order to dispose the one end of the inner cables within the distributing boxes, and a relay wall provided with a connector to which a cable from a control device for the robot is connected.

DETAILED DESCRIPTION

Figure 4:
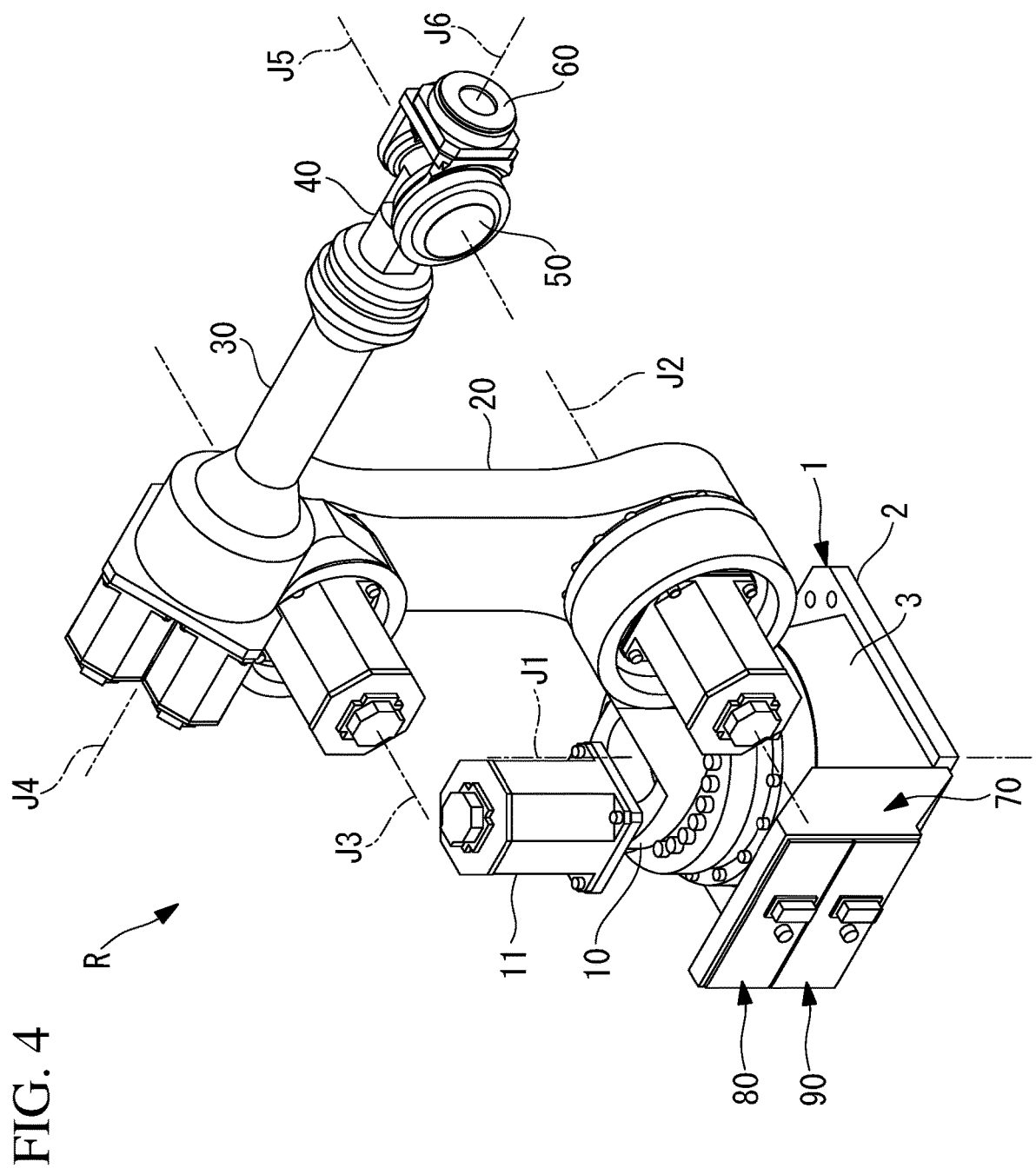
FIG. 4 is a perspective view of the robot according to this embodiment.

Hereinafter, a robot R according to an embodiment of the present invention will be described with reference to the drawings. The robot R according to this embodiment is a 6-axis articulated robot, for example. In this embodiment, as shown in FIG. 4, the robot R includes: a base 1 placed on a flower surface; a movable part (first movable part) 10 which is a rotating body that rotates about an axis line J1 extending vertically with respect to the base 1; and a movable part (second movable part) 20 which is an arm member that rotates about an axis line J2 extending, for example, horizontally with respect to the movable part 10.

The robot R further includes: a movable part 30 that rotates about an axis line J3 extending, for example, horizontally with respect to the movable part 20; and movable part 40 that rotates about an axis line J4 extending, for example, in a longitudinal direction of the movable part 30, with respect to the movable part 30. The robot R moreover includes: a movable part 50 that rotates about an axis line J5 extending, for example, perpendicularly to the axis line J4, with respect to the movable part 40; a movable part 60 that rotates about an axis line J6 extending, for example, perpendicularly to the axis line J5 with respect to the movable part 50. The robot R also includes a plurality of motors (not shown) for respectively driving the plurality of movable parts 10-60.

Figure 1:
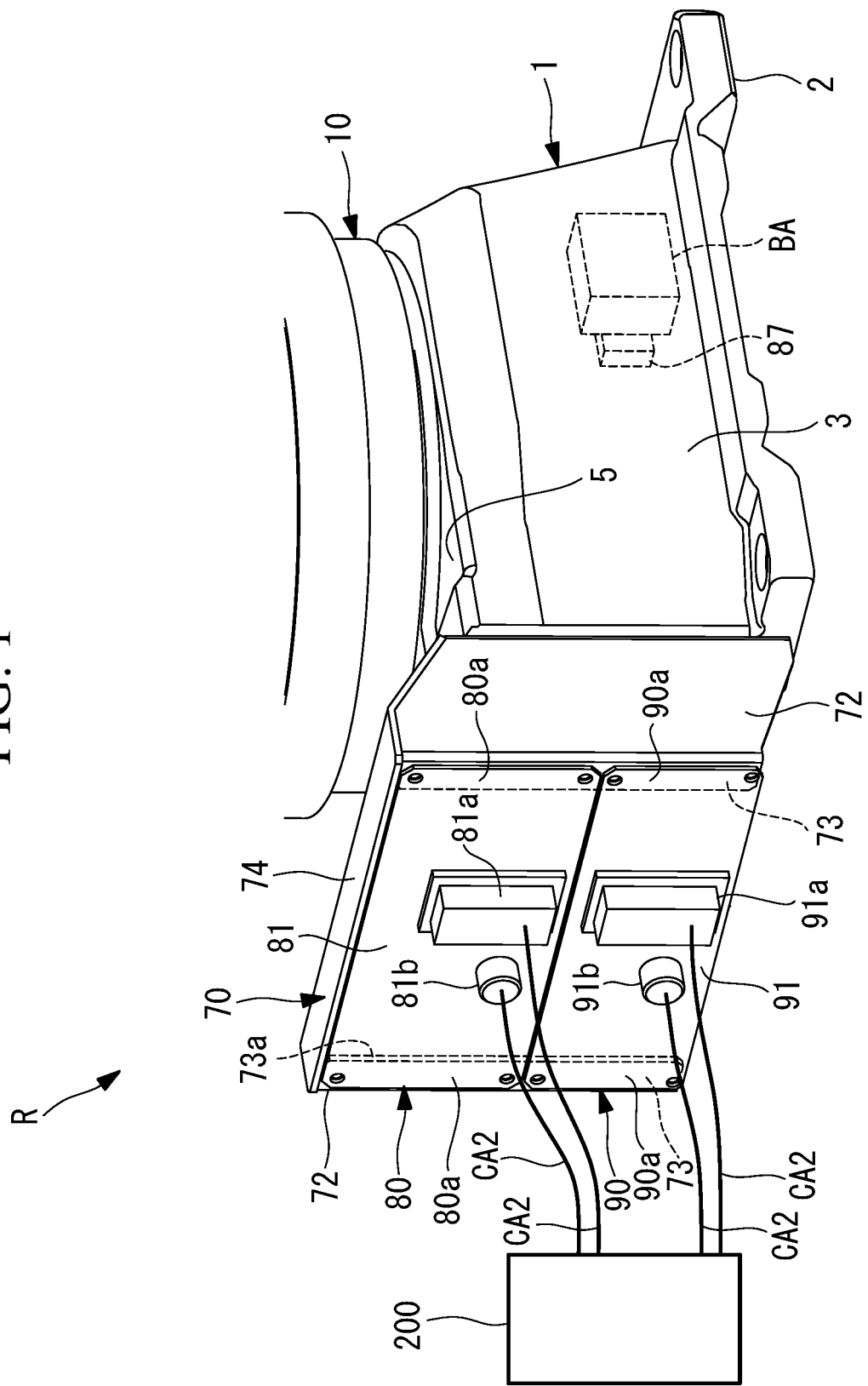
FIG. 1 is a perspective view of a main part of a robot according to an embodiment of the present invention.
Figure 2:
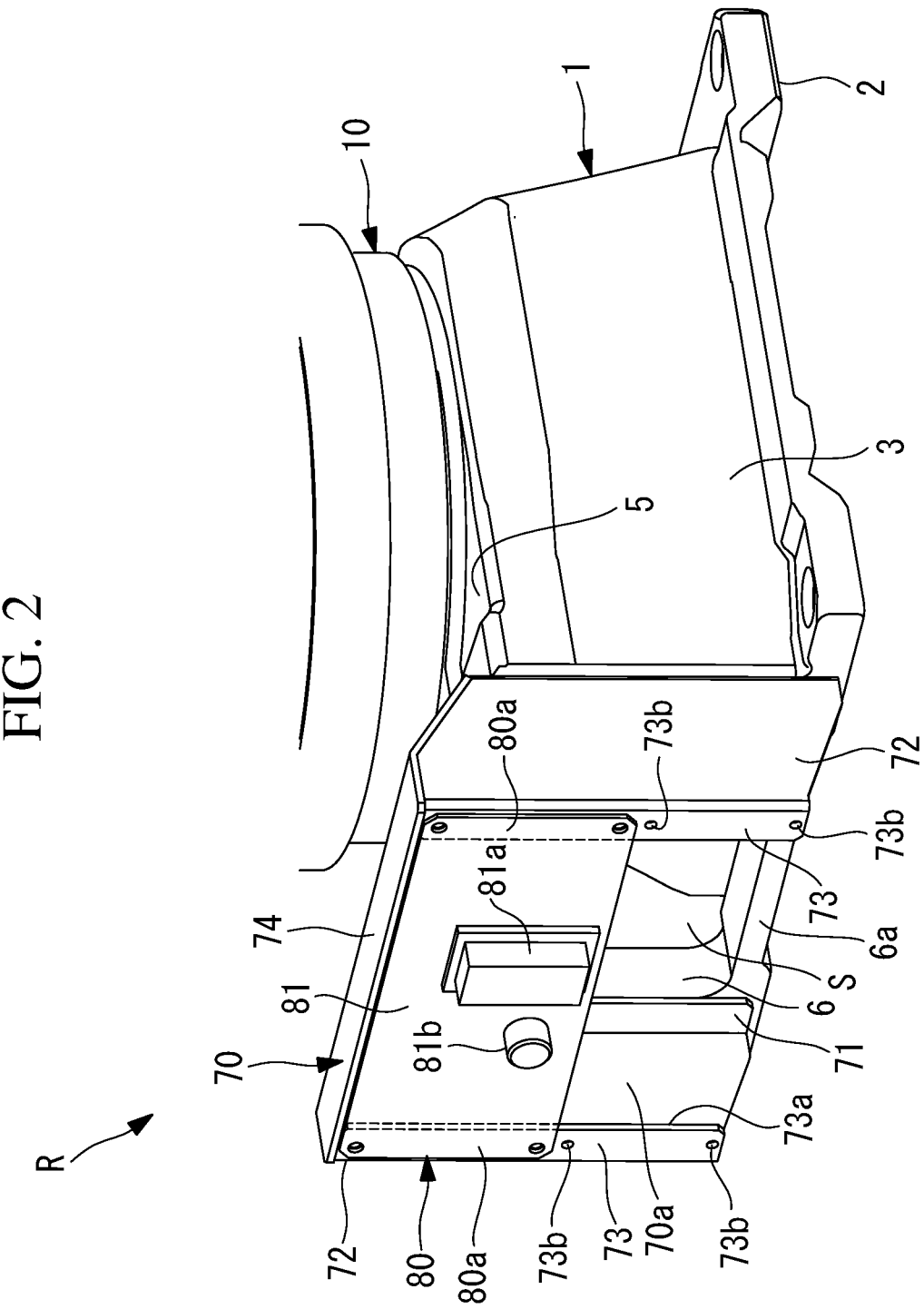
FIG. 2 is a perspective view of the main part of the robot according to this embodiment.
Figure 3:
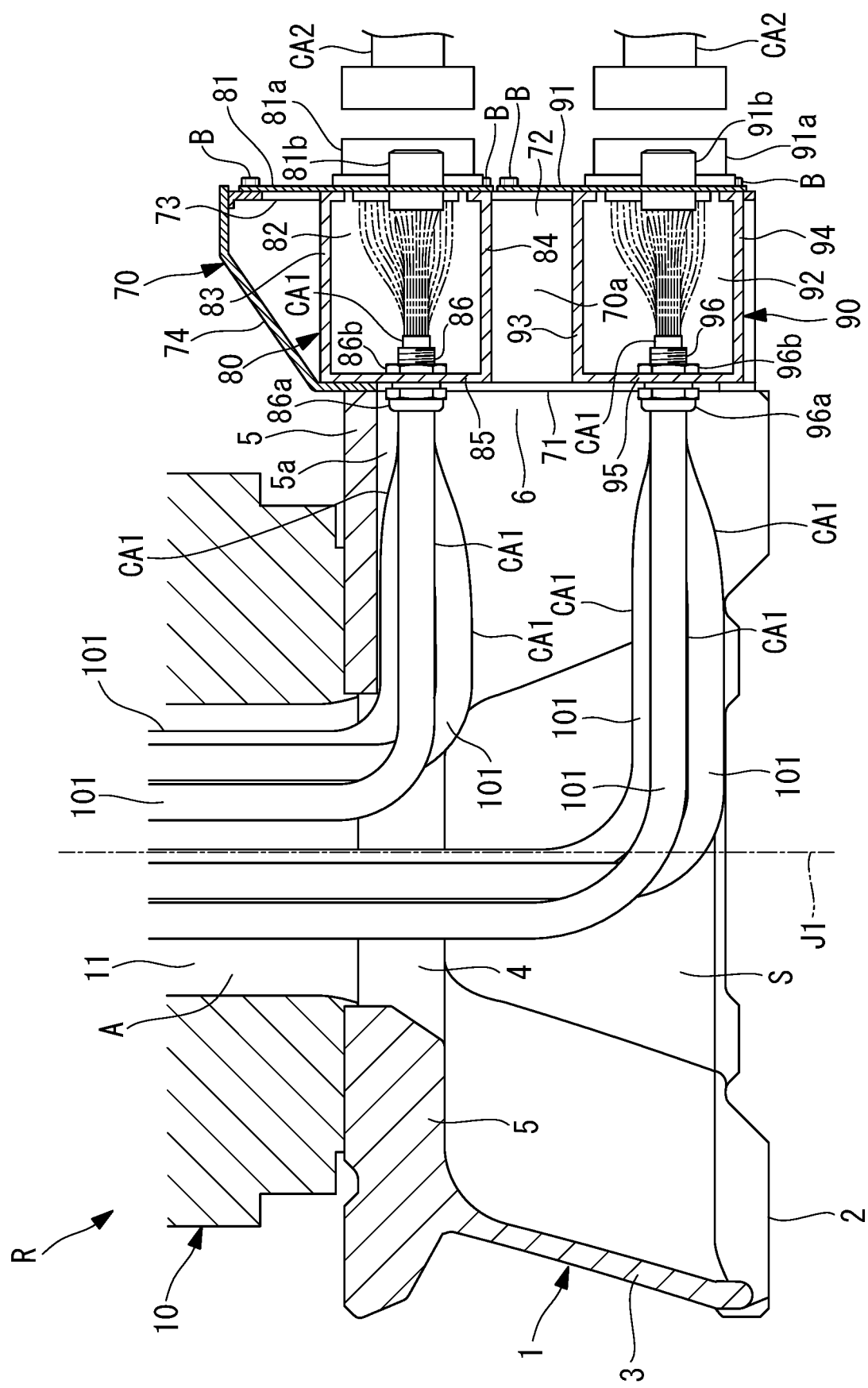
FIG. 3 is a sectional view of a base and distributing boxes of the robot according to this embodiment.

As shown in FIGS. 1 to 3, the base 1 includes: a bottom surface 2 with which the robot R is placed on the flower surface; a side wall portion 3 that extends upright from the bottom surface 2 in a vertical direction; and an upper end portion 5 having a central hole 4 in an area including the axis line J1 extending vertically. A part of the side wall portion 3, for example, the part disposed in a direction corresponding to a back surface of the robot R, is provided with an opening portion 6 for connecting an internal space S of the base 1 with the exterior.

The movable part 10 is provided with a through hole 11 penetrating therethrough in a vertical direction at a position corresponding to the central hole 4 of the upper end portion 5 of the base 1, and as shown in FIG. 3, the central hole 4 of the base 1 and the through hole 11 of the movable part 10 constitute a hollow portion A that connects the internal space S of the base 1 with an internal space of the movable part 10 in the area including the axis line J1. Inner cables CA1 extending between the internal space S of the base 1 and the exterior through the opening portion 6 extend vertically in the hollow portion A. As the hollow portion A is provided in the area including the axis line J1 as the rotational center of the movable part 10, even when the movable part 10 rotates with respect to the base 1, a large load may not be applied to the inner cables CA1 extending vertically in the hollow portion A. As shown in FIG. 3, a lower surface of the upper end portion 5 of the base 1 is provided with a groove 5a that connects the opening portion 6 with the central hole 4.

In this embodiment, the base 1 includes a wiring casing 70. In one example, the wiring casing 70 is fixed to the circumferential edge 6a of the opening portion 6 using a plurality of bolts. The wiring casing 70 includes a robot-side wall 71 that is in contact with a circumferential edge 6a of the opening portion 6. In this embodiment, the horizontal direction which is a longitudinal direction for the robot-side wall 71 and an upper-surface wall 74, which is later described, is often referred to as a width direction.

The wiring casing 70 includes a pair of side walls 72 respectively extending from both ends in the width direction of the robot-side wall 71. The pair of side walls 72 extend in a direction away from the base 1. The wiring casing 70 further includes a pair of attachment walls (attachment portions) 73 extending inwardly in the width direction respectively from ends of the pair of side walls 72, and the ends are ones which are opposite of the robot-side wall 71 (FIG. 2). The wiring casing 70 also includes the upper-surface wall 74 extending obliquely upward from an upper end of the robot-side wall 71, and the upper-surface wall 74 extends in a direction away from the base 1.

The pair of attachment walls 73 are disposed with an interval from each other. Therefore, between the pair of attachment walls 73, an opening portion 73a for connecting an internal space 70a of the wiring casing 70 with the exterior is provided. Further, each of the attachment walls 73 is provided with a plurality of thread holes 73b.

As shown in FIGS. 1 to 3, the plurality of distributing boxes 80 and 90 are detachably attached to the pair of attachment walls 73. Specifically, by threading bolts B inserted through flange portions 80a and 90a respectively of the distributing boxes 80 and 90 into the thread holes 73b, the distributing boxes 80 and 90 are attached to the attachment walls 73. At this time, the robot-side walls 85 and 95 respectively of the distributing boxes 80 and 90 are disposed in the vicinity of the opening portion 6 of the base 1. That is to say, the distributing boxes 80 and 90 are detachably attached to the vicinity of the opening portion 6 of the base 1. In other words, the distributing boxes 80 and 90 are detachably attached to the opening portion 73a or the vicinity of the opening portion 73a of the wiring casing 70 as a part of the base 1.

The distributing box 80 includes: a relay wall 81 both ends of which in the width direction serve as the flange portions 80a; a pair of side walls 82 that extend from both end sides of the relay wall 81; an upper wall 83 that extends from the relay wall 81 at its upper end or its middle portion in the vertical direction; and a bottom wall 84 that extends from a lower end of the relay wall 81. The pair of side walls 82, the upper wall 83, and the bottom wall 84 extend in a direction away from the relay wall 81. The robot-side wall 85 is fixed to ends of the pair of side walls 82, the upper wall 83, and the bottom wall 84 on a side opposite of the relay wall 81. Here, in this embodiment, the robot-side wall 85 and the relay wall 81 are plates that extend in the width direction.

The distributing box 90 includes: a relay wall 91, both ends of which in the width direction serve as the flange portions 90a; a pair of side walls 92 that extend from both end sides of the relay wall 91; an upper wall 93 that extends from an upper end of the relay wall 91; and a bottom wall 94 that extends from a lower end of the relay wall 91. The pair of side walls 92, the upper wall 93, and the bottom wall 94 extend in a direction away from the relay wall 91. The robot-side wall 95 is fixed to ends of the pair of side walls 92, the upper wall 93, and the bottom wall 94 on a side opposite of the relay wall 91. Here, in this embodiment, the robot-side wall 95 and the relay wall 91 are plates that extend in the width direction. Here, it is preferable that the relay walls 81 and 91 and the upper walls 83 and 93 of the respective distributing boxes 80 and 90 are detachable or are configured to be opened. With this, it is possible to facilitate wiring within the distributing boxes 80 and 90.

In this embodiment, the plurality of inner cables CA1 are disposed within the robot R. For example, a part of the plurality of inner cables CA1 disposed within the robot R contains power lines for supplying electric power to the movable parts 10, 20, 30, 40, 50, and 60, communication lines, and the like. These power lines, communication lines, and the like are covered by a covering member 101 such as a rubber tube or a conduit.

The other of the plurality of inner cables CA1 contains power lines for supplying electric power to tool or the like that is not shown attached to an end of the robot R, communication lines, and the like. These power lines, communication lines, and the like are covered by the covering member 101 such as a rubber tube or a conduit. Examples of the tool include various tools that can be attached to a tip end of the robot R, such as a hand, a machining tool, a laser machining tool, a painting tool, a cleaning tool, and a deburring tool.

Figure 5:
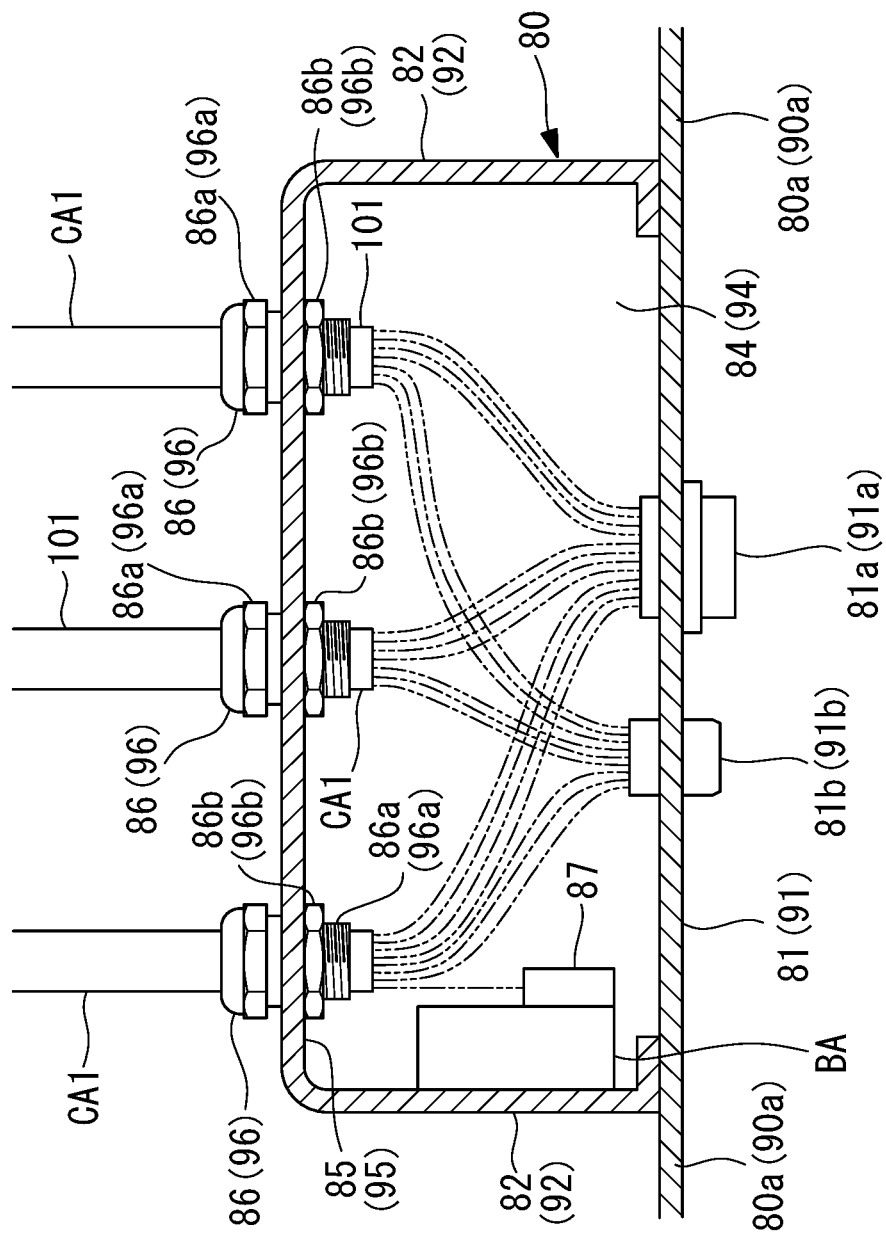
FIG. 5 is a sectional view of a distributing box of the robot according to this embodiment.

One end of the inner cables CA1 for supplying electric power and the like to the movable parts 10-60 is inserted through the robot-side wall 85, and thus the one end of the inner cables CA1 is disposed within the distributing box 80. Within the distributing box 80, power lines, communication lines, and the like are exposed from the covering member 101 at the one end of the inner cables CA1, and the power lines, the communication lines, and the like are respectively connected to connectors 81a and 81b of the relay wall 81 (FIG. 3 and FIG. 5). The connectors 81a and 81b are fixed to the relay wall 81, and are exposed to an interior of the distributing box 80, as well as to an exterior of the distributing box 80. Spaces between the connectors 81a and 81b and the relay wall 81 are sealed by known sealing members, known sealing materials, or the like. Portions of the connectors 81a and 81b disposed outside the distributing box 80 are connected to the outer cable CA2 for connecting a robot control device (control device) 200 for controlling the robot R with the distributing box 80.

One end of the inner cables CA1 for supplying electric power to the tool or the like is inserted through the robot-side wall 95, and thus the one end of the inner cables CA1 is disposed within the distributing box 90. Within the distributing box 90, power lines, communication lines, and the like are exposed from the covering member 101 at the one end of the inner cables CA1, and the power lines, the communication lines, and the like are respectively connected to connectors 91a and 91b of the relay wall 91. The connectors 91a and 91b are fixed to the relay wall 91, and are exposed to an interior of the distributing box 90, as well as to an exterior of the distributing box 90. Spaces between the connectors 91a and 91b and the relay wall 91 are sealed by known sealing members, known sealing materials, or the like. Portions of the connectors 91a and 91b disposed outside the distributing box 90 are connected to the outer cable CA2 for connecting a control device for controlling the tool or the robot control device 200 with the distributing box 80.

The one end of the inner cables CA1 for supplying electric power and the like to the movable parts 10-60 is inserted through a connecting member 86 attached to the robot-side wall 85. The connecting member 86 is often referred to as a connecting union. The connecting member 86 includes a male member 86a and a female member 86b that is threaded with the male member 86a. By threading the female member 86b with the male member 86a, an inner periphery surface of the connecting member 86 holds an outer periphery surface of the inner cables CA1. With this, a space between the connecting member 86 and the inner cables CA1 is sealed. The space between the connecting member 86 and the robot-side wall 85 is also sealed by a known sealing member, a known sealing material, or the like.

The one end of the inner cables CA1 for supplying electric power to the tool or the like is inserted through a connecting member 96 attached to the robot-side wall 95. The connecting member 96 is often referred to as a connecting union. The connecting member 96 includes a male member 96a and a female member 96b that is threaded with the male member 96a. By threading the female member 96b with the male member 96a, an inner periphery surface of the connecting member 96 holds the outer periphery surface of the inner cables CA1. With this, the space between the connecting member 96 and the inner cables CA1 is sealed. The space between the connecting member 96 and the robot-side wall 95 is also sealed by a known sealing member, a known sealing material, or the like.

As one example, as shown in FIG. 5, the one ends of the plurality of inner cables CA1 for supplying electric power and the like to the movable parts 10-60 are inserted through the robot-side wall 85. Further, the one ends of the plurality of inner cables CA1 for supplying electric power to the tool or the like are inserted through the robot-side wall 95. The power lines, communication lines, and the like that are exposed from the covering member 101 at the one ends of the inner cables CA1 are respectively connected to the connectors 81*a*, 81*b*, 91*a*, and 91*b*. Here, in addition to the power lines and the communication lines, a tube for supplying air and a tube for supplying material may be inserted through the distributing boxes 80 and 90.

In this embodiment, as described above, the power lines, communication lines, and the like that are exposed from the covering member 101 at the one ends of the inner cables CA1 are respectively connected to the connectors 81*a*, 81*b*, 91*a*, and 91*b* within the distributing boxes 80 and 90. Therefore, portions of the inner cables CA1 exposed from the covering member 101 are protected from water and dust by the distributing boxes 80 and 90. Accordingly, even if the robot R is frequently washed at an installation place, the inner cables CA1 and the power lines, the signal lines, and the like within the distributing boxes 80 and 90 are protected from water, detergent, and the like.

The general-purpose robot R is often not provided with a high level of water-resistant and dust-resistant capabilities. Providing all of such general-purpose robot R with such high level of water-resistant and dust-resistant capabilities can be overengineering, resulting in an increased cost. In this embodiment, even when the robot R is not configured to have a high level of water resistance and dust resistance, it is possible to easily provide cables of the robot R additionally with a high level of water-resistant and dust-resistant capabilities.

Further, in this embodiment, the plurality of inner cables CA1 are respectively connected to the plurality of distributing boxes 80 and 90. As described above, as the plurality of distributing boxes 80 and 90 are attached detachably to the base 1, it is possible to provide a water-resistant or dust-resistant configuration for a part or all of the plurality of distributing boxes 80 and 90 according to an environment in which the robot R is installed. As one example, a part or all of the distributing boxes 80 and 90 may be configured without the upper walls 83 and 93, and without the side walls 82 and 92. As described above, in order to respond to needs of a wide range of users, it is highly advantageous to be able to select, as appropriate, the distributing boxes 80 and 90 with a configuration having a high level of water resistance and dust resistance according to a required specification of the robot R.

Further, in this embodiment, one end of the inner cables CA1 for driving the plurality of movable parts 10-60 of the robot R is disposed within the distributing box 80 out of the plurality of distributing boxes 80 and 90. Moreover, one end of the inner cables CA1 for the tool attached to the robot R is disposed within the other distributing box 90. As described above, by providing the distributing box 80 for the basic inner cables CA1 for operating the robot R and the distributing box 90 for the inner cables CA1 for the tool separately, a degree of freedom for wiring of the inner cables CA1 for the robot R or for performing maintenance of the robot R is improved.

For example, the inner cables CA1 and the distributing box 80 are mounted on the robot R after assembling the basic inner cables CA1 for operating the robot R and the distributing box 80. Further, the inner cables CA1 and the distributing box 90 are mounted on the robot R after assembling the inner cables CA1 for the tool and the distributing box 90. Specifications of the distributing box 80 and the distributing box 90 may be selected as described above. In addition, when maintenance of the distributing box 80 alone is required, it is not necessary to detach or disassemble the distributing box 90.

Here, as shown in FIG. 5, a battery BA used for storing data of the robot R may be disposed within the distributing box 80 or the distributing box 90. As one example, as shown in FIG. 1, the battery BA is disposed within the distributing box 80. The battery BA is connected to a memory device 87 provided within the distributing box 80, and a communication line from the inner cable CA1 is connected to the memory device 87. The communication line is connected to an operational position detecting device such as an encoder of the motors of the respective movable parts 10-60. In this case, the battery BA is also provided with water resistance and dust resistance by the distributing boxes 80 and 90.

On the other hand, the battery BA and the memory device 87 may be attached to the base 1 (FIG. 1), instead of being placed within the distributing boxes 80 and 90. In this case, the battery BA that is large in volume is not disposed within the distributing boxes 80 and 90. In addition to the configuration of this embodiment in which the plurality of distributing boxes 80 and 90 are attached detachably to the base 1, the battery BA being attached to the base 1 results in facilitation of assembly of the inner cables CA1 to the robot R, and further improvement in a degree in freedom in wiring or maintenance of the inner cables CA1.

It should be noted that the distributing boxes 80 and 90 may be configured so that their interiors are sealed when attached to the base 1. In this case, for example, the distributing box 80 does not include the upper wall 83, and the distributing box 80 may not be sealed by itself. When the distributing box 80 is attached to the wiring casing 70 of the base 1, the interior of the distributing box 80 is sealed by the relay wall 81, the pair of side walls 82, the bottom wall 84, the robot-side wall 85, and the upper-surface wall 74 of the wiring casing 70. In this case, the distributing box 80 is also understood to have a sealed structure.

Here, another distributing box may be provided, in addition the distributing boxes 80 and 90. Further, the distributing boxes 80 and 90 may be detachably attached to the opening portion 6 of the base 1. In this case, the same effect as described above may be obtained.

The invention claimed is:

1. An articulated robot comprising:
   a base;
   a first movable part supported by the base so as to be rotatable about a vertical axis line; and
   a second movable part supported by the first movable part so as to be rotatable about a predetermined axis line, wherein
   the base includes an opening portion,
   the robot includes a plurality of distributing boxes that are detachably attached to the opening portion or to a portion near the opening portion of the base, and
   each of the distributing boxes includes: a robot side wall through which one end of inner cables disposed within the robot is inserted in order to dispose the one end of the inner cables within the distributing boxes; and a relay wall,
   wherein a first connector, to which a first cable is to be connected, is fixed to the relay wall of at least one of the plurality of distributing boxes, and a second connector, to which a second cable is to be connected, is fixed to the relay wall of one or more others of the plurality of distributing boxes,
   wherein the one or more others of the plurality of distributing boxes are capable of being removed from the base together with their relay walls in a state in which the one of the plurality of distributing boxes is attached to the base together with its relay wall.

2. The robot according to claim 1, wherein the one end of part of the inner cables for driving a plurality of movable parts of the robot is disposed within the one of the plurality of distributing boxes, and the one end of part of the inner cables for a tool attached to the robot is disposed within the one or more others of the plurality of distributing boxes.

3. The robot according to claim 1, wherein the base is provided with a battery for storing data for the robot.

\* \* \* \* \*